Figure 1:
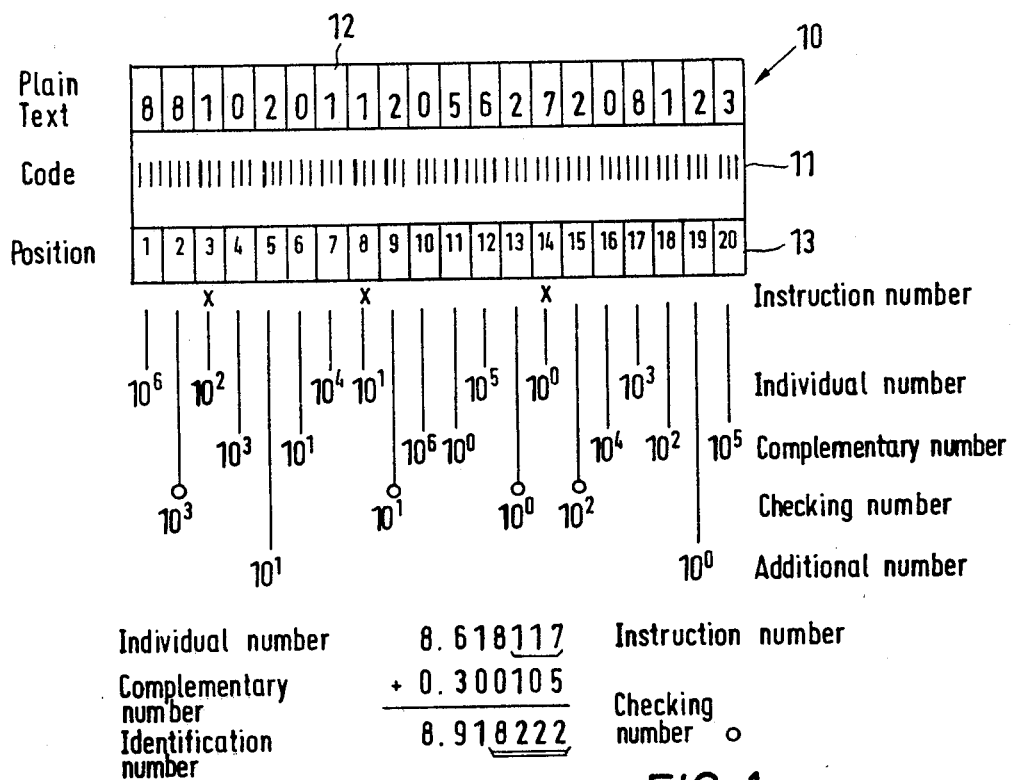

235-382
7/13/82    XR    4,339,820    SR

United States Patent [19]

Stockburger

[11] 4,339,820

[45] Jul. 13, 1982

[54] METHOD AND DEVICE FOR CODING AND/OR DECODING AND SECURING DATA

[76] Inventor: Hermann Stockburger, Kirnachweg 7, D-7742 St. Georgen, Fed. Rep. of Germany

[21] Appl. No.: 179,710

[22] Filed: Aug. 20, 1980

[30] Foreign Application Priority Data

Aug. 21, 1979 [DE] Fed. Rep. of Germany ....... 2933764

[51] Int. Cl.³ .............................................. G06F 11/10
[52] U.S. Cl. ..................................... 371/53; 235/382; 235/437
[58] Field of Search ................. 371/53; 235/382, 437; 340/149 R, 149 A; 364/200, 900

[56] References Cited

U.S. PATENT DOCUMENTS

| 3,235,716 | 2/1966 | Porter et al. | 371/53 |
| 3,700,859 | 10/1972 | Laurer et al. | 235/382 |
| 3,845,470 | 10/1974 | Schuller | 340/149 R |
| 3,846,622 | 11/1974 | Meyer | 235/382 |
| 3,857,019 | 12/1974 | Holtey | 235/437 |
| 3,892,948 | 7/1975 | Constable | 340/149 R |
| 3,990,558 | 11/1976 | Ehrat | 340/149 R |
| 4,198,619 | 4/1980 | Atalla | 340/149 A |
| 4,245,308 | 1/1981 | Hirschman et al. | 371/53 |
| 4,268,715 | 5/1981 | Atalla | 340/149 R |

*Primary Examiner*—Charles E. Atkinson
*Attorney, Agent, or Firm*—Donald Brown

[57] ABSTRACT

A method of securing data on a data support and means for performing the method are provided. In the method, the data of successive data units forming a coded text are rearranged and recorded on the data support in coded form. Coding is performed in accordance with a variable code. The variable code is determined by a given number contained in the text and individually characterizing the data support. Decoding of data recorded in accordance with the method is governed by an instruction number controlling the coding and/or decoding device.

7 Claims, 3 Drawing Figures

METHOD AND DEVICE FOR CODING AND/OR DECODING AND SECURING DATA

FIELD OF INVENTION

The invention generally relates to the field of securing data by coding and/or decoding, particularly with respect to data which are marked on data supports and in which a plurality of data units arranged in succession to form a text, are distributed over and marked in said distributed form on the data support.

BACKGROUND OF THE INVENTION

Many methods of securing and coding data which are marked on data supports are known, including distribution or rearrangement and/or scrambling of data, in such a way that the succession of the data is modified so that the text cannot be decoded entirely without knowledge of the rearrangement code. However, this method is as safe as the data rearrangement code can be maintained secret. There is an important need of marking documents and items with automatically readable data in unintelligible manner. If depends to a large extent from the security against falsification of these data whether the system concerned is suitable for releasing events having legal and/or financial consequences. Examples for use of such data supports are cheque cards which are inserted into automatic distributors or automatic money distributors to release the delivery of wares or money, documents such as passports or stocks, which may be automatically read and checked for authenticity etc. With the known methods by thorough studying a plurality of various data supports, the rules of coding the data may be discovered. As soon as these rules are no more secret, the entire coding is practically without any value because data supports may be falsified by non-authorized persons.

SUMMARY OF THE INVENTION

Accordingly, a primary object of the invention is to provide a method of coding data in which coding and distribution of the data is not performed in accordance with a predetermined constant code, but rather the code to be applied is changed from one data support to the next data support, so that no cosistent rule may be discovered in the code even in presence of a plurality of various marked data supports.

A further object of the invention is to provide a device for coding data in accordance with said method.

A still further object of the invention is to provide a decoding device for decoding data coded in accordance with said method.

The invention provides that the text includes an individual number for the data support of which at least one digit represents an instruction number which is marked at a predetermined position of the data support, and that the distribution of the remaining data units is performed on the data support in accordance with a code depending on the instruction number.

Scrambling of the data is thus performed depending on the instruction number which indicates the rule of rearrangement of the various digits or digit groups within the text. In case of three digits instruction numbers a distinction can be made between 1000 different rearrangement rules. With this large number of possible rearrangement rules there is practically no possibility for any falsifier to find out the respective rearrangement rule to be applied.

In case of data being coded in this manner, in order to assure that upon decoding, any arbitrary result will not be found but rather the individual number and the identifying number will be safely reproduced, a convenient improvement of the invention provides that the individual number is mathematically combined with an identification number to be coded, in order to generate a complementary number which is being recorded on the data support, and that, additionally, selected positions of the identification number are recorded on the data support as a checking number and are compared upon decoding with the corresponding positions of the identification number recovered from the individual number and the complementary number.

In this manner, upon analysing the data support, it will be possible to determine whether the rearrangement rule and the mathematical combination correspond to the rules used upon coding of the data. Recognition of authenticity and correctness will only be made in case the checking number corresponds with the identification number. As the identification number is generated upon analysing of the data support through a complex mathematical method, authenticity of the recorded data will only be determined in case of real authenticity.

The invention further relates to a device for coding of data to be recorded on a data support. In accordance with the invention data input means for the individual number and the identification number are provided which form a complementary number from the identification number and the individual number by mathematical combination and which delivers the complementary number together with the individual number and at least a portion of the indentification number as a checking number to a first register and a portion of the individual number as an instruction number to a control means for a coding device, the coding device performing the rearrangement of the individual digits into a second register in accordance with the instruction number.

It is of particular advantage that the instruction number represents a portion of the individual number. The individual number can e.g. be a current number of the data support. In this case, each data support has its own number which may eventually be centrally registered so that the data support may be identified by its number. The rearrangement rule for coding the data depends from this number.

A decoding device having reading means for the data registered on the data support and transmitting the read data into a first register is characterized in accordance with the invention by the fact that control means for a coding device receive the data of selected positions of the first register and control the coding device in accordance with the instruction number in such a way that the coding device transmits the data of the individual number, the complementary number and the checking number in united form to a second register.

Thus, the first register receives the data scrambled in accordance with the rearrangement rule, the second register receiving the data in their ordered form.

The term "complementary number" is generally to be understood in a broad sense. It is that number with which the individual number must be processed upon decoding in order to recover the identification number.

Preferably, in the decoding device, the second register is connected to a calculating circuit combining the individual number and the complementary number with each other to determine the identification number therefrom. Selected positions of the identification number can be compared in a comparator with the checking number remaining in the register. Only upon coincidence of the identification number with the checking number, the correctness of the individual number and the identification number found will be recognized.

Figure 2:
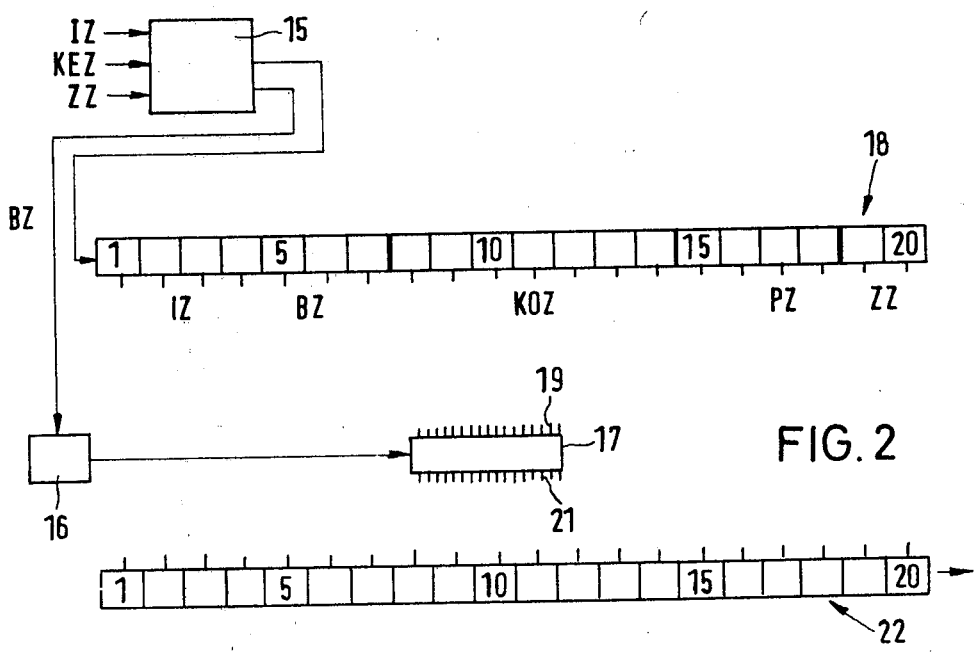
Figure 3:
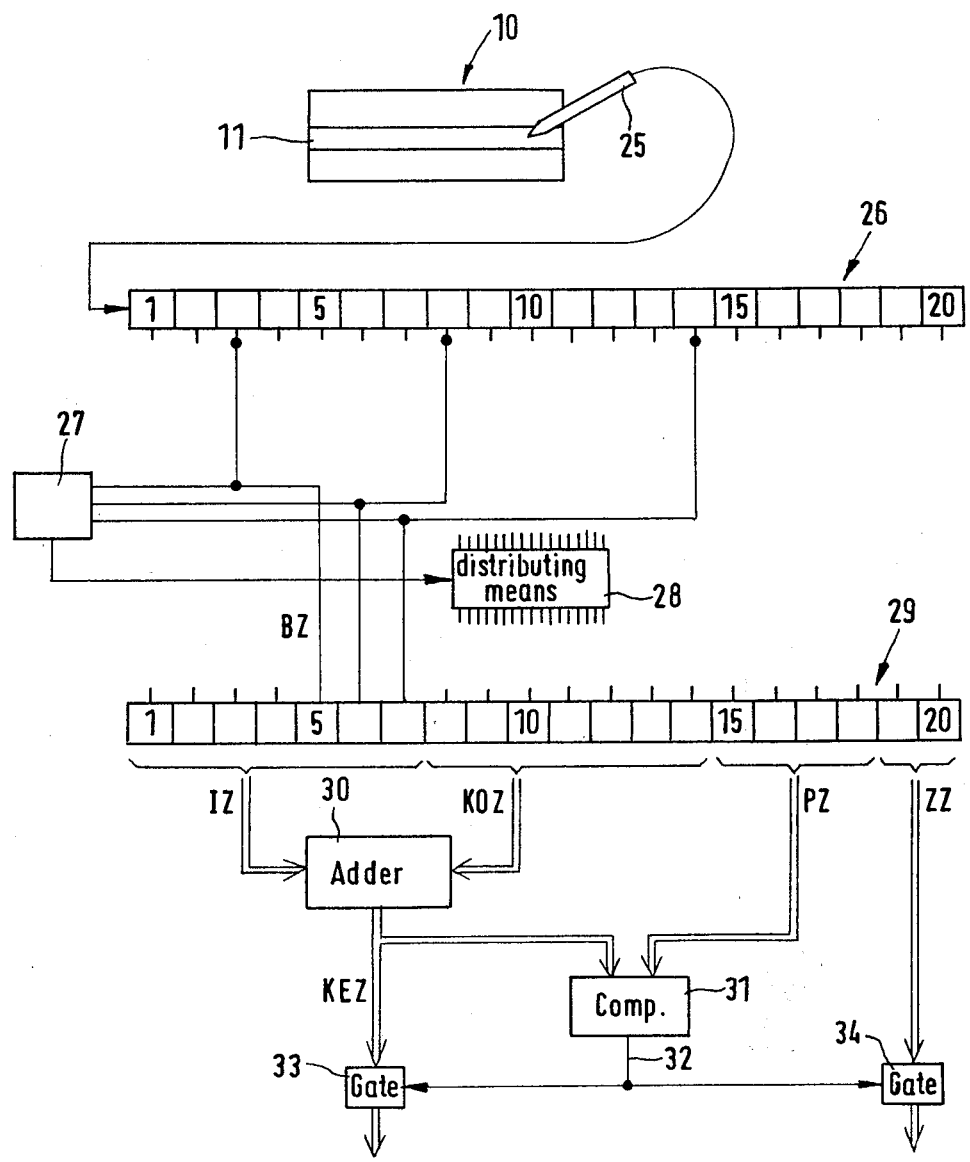

Further features, objects and advantages of the invention will now be disclosed with reference to the drawings showing several embodiments which are to be understood as non-limitative examples. In the drawings:

FIG. 1 shows a representation of a data support the information track of which is marked with a dash code, FIG. 2 shows a block diagram of a coding device for marking the data support, and FIG. 3 shows a block diagram of a decoding device for reading the data support and for recovering the registered information.

The data support 10 shown is provided with an information track 11 on which the data are marked in form of decimal digits. For marking, a conventional dash width code is used. Within a plain text track 12, each digit of the information track 11 is associated with one zone comprising the respective digits in printed form which are contained on the information track 11 in the form of automatically readable characters. For identifying the individual digit positions, a current number is provided on a further track 13.

The information track 11 contains a multiplicity of scrambled digits. A digit group represents an individual number, and a portion of the digits of the individual number represents an instruction number. Further, a complementary number, a checking number and an additional number are contained on the information track 11. The individual digits of these numbers are scrambled in such a way that their association with any determined number cannot be easily recognized. In FIG. 1, the associations of the individual digits with the corresponding numbers are represented below the data support 10 on different levels. Additionally, for each digit, the corresponding decimal power is indicated. The individual number (current number of the data support) may be e.g. 8618117. In case the identification number (e.g. ordering number of an item or characterization of one type of client) is 8918222, subtracting the individual number from the identification number yields a complementary number 0300105.

The last three digits 117 of the individual number are the instruction number. These three digits are on the data support 11 at predetermined positions, e.g. at positions 14, 8 and 3.

FIG. 2 shows a block diagram of a device for marking a data support 10.

A data input device 15 is supplied with the individual number IZ, the identification number KEZ and the additional number ZZ. The input device separates from the individual number IZ the three last digits forming the instruction number BZ and supplies these to a control device 16 of a coding device 17. Thus, the control device is programmed in according with "program 117". This program consists in scrambling the digits of the individual number IZ (with the exception of the last three digits), the identification number KEZ and the additional number ZZ in accordance with a determined rule so that the digits of the respective numbers will be in a series as shown in FIG. 1 as an example.

The input device 15 subtracts from the identification number KEZ the individual number IZ in order to form the complementary number KOZ. Additionally, the last four digits are separated from the identification number KEZ and transmitted as the checking number PZ. The first three digits of the seven digit identification number are not marked on the data support. However, the additional number ZZ remains without being modified.

The data input device 15 supplies the individual number IZ, the complementary number KOZ, the checking number PZ and the additional number ZZ to a first register 18 having twenty digits corresponding to the storing capacity of the data support 11. In register 18, the respective positions or digits of the respective number have fixed mutual associations.

The coding device 17 has a total number of twenty inputs 19 connected with the outputs of the respective positions of the first register 18. The outputs 21 of the coding device 17 are connected with the inputs of a second register 22. The control means 16 controls the coding device 17 in such a manner that each digit contained at a determined position of the first register 18 will reach a determined position of the second register 22 in accordance with a determined program. In this manner the respective digits will be in the succession standing out from FIG. 1. The content of register 22 is supplied to a writing head for marking the data support 10.

A decoding device is shown in FIG. 3. The information track 11 of the data support 10 is scanned with a reading pencil 25 and the respective digits are input into a first register 26 in the same order they have been read. The fourteenth, eighth and third positions of register 26 are sampled by a control device 27 to determine the instruction number (117). The control device 27 controls distributing means 28 in accordance with the instruction number, the distributing means transferring the content of the first register 26 into the positions of a second register 29 in correspondingly rearranged form. Thus, the distributing means 28 operates in inverted manner with respect to the coding device 17 of FIG. 2.

The individual number IZ, the complementary number KOZ, the checking number PZ and the additional number ZZ are again contained in the second register 29 in united form. Those positions of register 29 in which the individual number IZ is stored are read out into an adder 30 to which the complementary number KOZ is additionally supplied. The adder 30 adds those numbers and supplies the identification number KEZ at its output. The four last digits of the identification number KEZ are split off and supplied to one input of a comparator 31. The other input of the comparator 31 is supplied with the checking number PZ contained in register 29. When comparator 31 determines coincidence at both of its inputs a signal is generated at the output 32 through which a gate 33 for delivering the identification number KEZ and a gate 34 for delivering the additional number ZZ are opened. Only in this case, the data support 10 is being recognized as authentic.

The individual number IZ may also represent an amount of money, a subscriber number, time, data, inventory or any other number for the purpose of organization.

A further field of use of the invention is the identification of value cards, data transmission of display screen texts to be kept secret, etc.

What is claimed is:

1. A method of coding and securing data marked on a data support, in which a plurality of data units forming a text when arranged in succession are distributed over and recorded on said data support, wherein said text is formed with an individual number associated with said data support, at least one digit of said individual number representing an instruction number which is recorded at a predetermined zone of said data support, and said instruction number is used for defining a predetermined code for distributing the remaining data units of said text on said data support.

2. The method of claim 1, wherein said individual number is mathematically combined with an identification number contained in said text to be coded to generate a complementary number which is recorded on said data support, and selected digits of said identification number are marked on said data support as a checking number.

3. The method of claim 2, wherein said identification number is recovered by decoding and said selected digits of said recovered identification number are compared with said checking number.

4. A coding device for performing the method of claim 1 comprising data input means for supplying said individual number and said identification number, said data input means including combining means for forming a complementary number from said identification number and said individual number by mathematical combination, said data input means supplying said complementary number together with said individual number and at least a portion of said identification number to a first register as a checking number and supplying a portion of said individual number as an instruction number to coding control means for controlling said distribution of digits representing said text data units into a second register in accordance with a code defined by said instruction number.

5. A decoding device for decoding a text coded in accordance with the method of claim 1, including a reading device for reading data recorded on said data support and feeding the read data to a first register, control means for controlling distributing means receiving data of selected positions of said first register and controlling said distributing means in accordance with said instruction number in such a manner that said distributing means transmits the data of said individual number, said complementary number and said checking number in united form into a second register.

6. The decoding device of claim 5, wherein said second register is connected to an adding circuit for combining said individual number and said complementary number with each other to determine said identification number therefrom.

7. The decoding device of claim 6, wherein selected digits of said identification number are compared in a comparator with said checking number transmitted to said second register.

* * * * *